Nov. 4, 1941.　　　S. KIESSKALT ET AL　　　2,261,257
MACHINE FOR TREATING PLASTIC MASSES AND FIBROUS MATERIALS
Filed April 21, 1938　　　4 Sheets-Sheet 1

Siegfried Kiesskalt
Wilhelm Schaich
INVENTORS

BY
THEIR ATTORNEYS

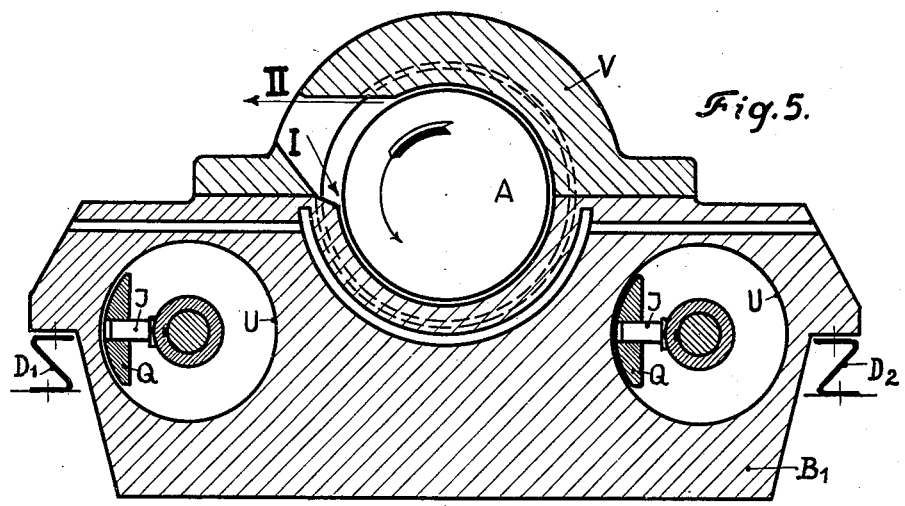

Nov. 4, 1941. S. KIESSKALT ET AL 2,261,257
MACHINE FOR TREATING PLASTIC MASSES AND FIBROUS MATERIALS
Filed April 21, 1938 4 Sheets-Sheet 4

Siegfried Kiesskalt INVENTORS
Wilhelm Schaich
BY Hartz and Joslin
THEIR ATTORNEYS Patented Nov. 4, 1941

2,261,257

UNITED STATES PATENT OFFICE 2,261,257

MACHINE FOR TREATING PLASTIC MASSES AND FIBROUS MATERIALS

Siegfried Kiesskalt, Frankfort-on-the-Main-Hochst, and Wilhelm Schaich, Bad Soden in Taunus, Germany, assignors, by mesne assignments, to Walther H. Duisberg, New York, N. Y.

Application April 21, 1938, Serial No. 203,296
In Germany April 23, 1937

7 Claims. (Cl. 18—2)

The present invention relates to an improved machine for simultaneously squeezing and beating plastic masses or fibrous materials.

In the commercial treatment of plastic masses, plastic ceramic masses, rubber and the coagulates thereof and the like, and of fibrous materials such as wool felts it is frequently necessary to subject the material to a continuous squeezing operation in order to produce a desired physical condition of the material. For such squeezing, rotors or calenders and beaters such as fulling mills are used.

This invention relates to a rapidly oscillating machine for simultaneously squeezing and beating such materials. It comprises a rotor mounted in a correspondingly hollow mould and means for producing oscillation in the relative movement of the rotor and the hollow mould, there being a space between the rotor and the hollow mould. The rotor or the hollow mould or both are resiliently mounted. At least one of these resiliently mounted parts is caused to oscillate in a plane substantially perpendicular to the axis of the rotor.

In the accompanying drawings Fig. 1 is a diagrammatic cross section through a machine which illustrates the invention.

A rotor A rotatable in stationary bearings is rotated in a mass B which is shaped as a hollow mould and is arranged to oscillate on springs $D_1$ and $D_2$. Circular oscillation may be imparted to hollow mould B by the action of unbalanced masses $C_1$ and $C_2$ fixedly mounted upon shafts Z. The plastic mass or the like situated in the crevice between roll A and hollow mould B is thus uniformly and continuously kneaded. In cross section this crevice may be excentric to the rotor or concentric therewith. The roll A causes by its rotation a continuous movement of the mass to be kneaded. The mass enters the crevice at I and is taken off at II. The working surface of hollow mould B or of rotor A or of both may be wholly or in part profiled. The profile of the working surface may for instance be undulated or fluted, depending on the intended purpose, or separate pins or projections may be arranged in line with each other or in staggered arrangement. The profile may also vary in the direction of the passage of the material to be treated, for instance by increasing or decreasing dimensions of the flutings of the hollow mould. Hollow mould B may also be subdivided in the direction of travel of the material in such a manner that the material is successively treated on the different parts of the hollow mould which are given oscillations of a different velocity or of a different intensity.

It may be advantageous to heat rotor A or hollow mould B or both or to cool them, or a device may be provided for simultaneously passing liquids or the like through the space in which the mass is treated. In Fig. 1 $M_1$ and $M_2$ represent channels for the passage of heating or cooling medium.

In Fig. 1 hollow mould B oscillates in the path of a circular or similar curve in a plane which is substantially perpendicular to the axis of the rotor. The invention, however, is not limited to this mode of operation; the movement of the rotor or the hollow mould or both with respect to each other may be any that is suitable for producing the desired relative oscillation as well as all possible combinations of rotation and oscillation; for example the hollow mould may be stationary and the rotor may both revolve on its axis and oscillate, or both parts may be oscillated.

A further advantage of the machine is its adaptability to perform various types of oscillating motions. The direction and velocity of rotation of rotor A as well as the frequency and direction of oscillation and also the path followed during the oscillation by the oscillating parts may be varied. Furthermore, when two unbalanced masses such as $C_1$ and $C_2$ are used to impart oscillation, their masses may differ from one another so that the material is subjected to different stresses in the different zones of the crevice between the rotor and the hollow mould.

Fig. 2 is a longitudinal sectional elevation.

Fig. 3 is a plan view, and

Fig. 4 is a plan view with rotor A not shown.

Figure 1:
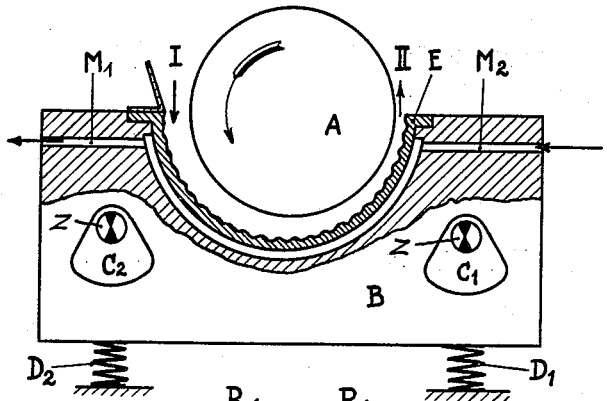
Figure 2:
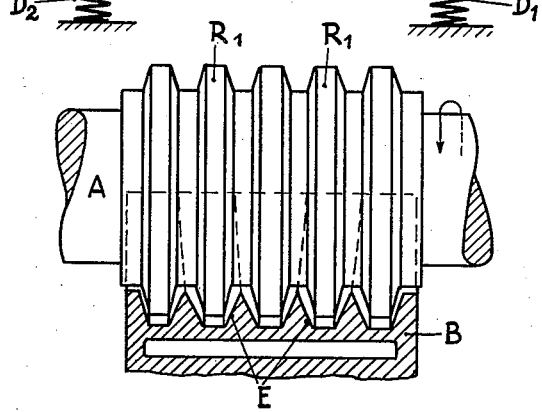
Figs. 2 to 4 show profiles suitable for rotor A and hollow mould B.
Figure 3:
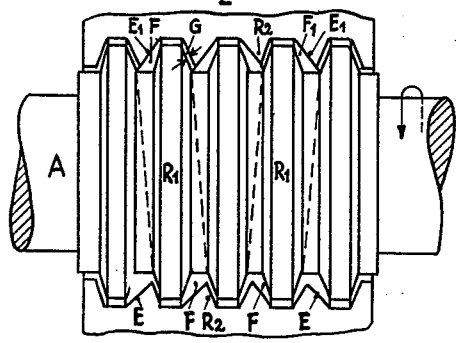
Figure 4:
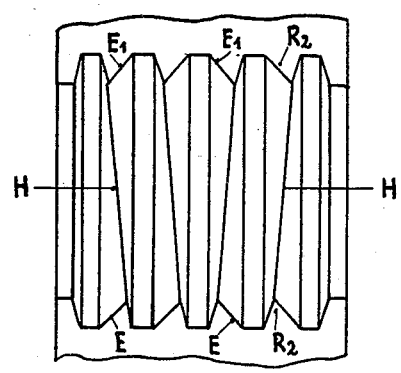

In these figures the profiles of rotor A have the form of combs $R_1$ which are engaged in the grooves formed between the combs $R_2$ of hollow mould B. In order to obtain a squeezing and beating action in the axial direction as well as in the radial direction and thereby essentially to improve the effect, the combs $R_2$ of hollow mould B are constructed in such a manner that by cutting away the flanks E and $E_1$ of the combs at the inlet and outlet of the material to be treated, relatively to the combs $R_1$ of rotor A, the wide crevices F and $F_1$ are formed, so that the combs of the rotor are in inclined relation to those of the hollow mould. As the crevice F narrows at G the material introduced into the crevice is squeezed by way of the edge H into the opposite crevice $F_1$ whence it leaves the apparatus.

In order to balance in such an arrangement the axial stress which is set up by the stresses in this direction flanks E and $E_1$ of combs $R_2$, which flanks are turned away from each other, are so constructed in the aforesaid manner that edges H formed by the cutting of the combs diverge towards the outlet side of the material.

Figs. 5 and 6 illustrate an arrangement wherein hollow mould B is subdivided into 3 parts in such a manner that unrequired oscillations of the bearings of rotor A, as well as of the foundations of the whole machine, are avoided as far as possible by causing the required oscillating movements to occur in opposite directions.

Fig. 5 is a cross section on line $x$—$x$ of the plan shown in Fig. 6.

Rotor A, the profiled combs of which are engaged in the corresponding grooves of hollow mould B is rotatably mounted in stationary bearings $T_1$ and $T_2$. Hollow mould B is subdivided into 3 parts $B_1$, $B_2$ and $B_3$ in such a manner that parts $B_2$ and $B_3$ which are equal in respect of the action of their mass together have the same action of mass as part $B_1$. Each part $B_1$, $B_2$ and $B_3$ is carried by springs $D_1$ and $D_2$ so that it can be oscillated and is provided with a coaxial track U on which exciting weight Q slides, being free to move radially on guide bolt J.

Guide bolts J of oscillation exciters Q are keyed to shafts K journalled in parts $B_2$ and $B_3$ and are mounted in such a manner that exciters Q of parts $B_2$ and $B_3$ act in the same direction and with the same effect, whereas exciter weights Q of part $B_1$ act in the opposite direction (turned by an angle of 180°) but with the same effect as the joint effect of the exciter weights of parts $B_2$ and $B_3$. A clearance is provided between shafts K and part $B_1$. When shafts K are rotated, weights Q are forced against track U by centrifugal force, thus causing part $B_1$ to oscillate in a phase opposite to that of parts $B_2$ and $B_3$. In this manner the forces to which the bearings of rotor A and the foundation of the machine are subjected are effectively counter-balanced. The machine as a whole is thus substantially free from vibrations.

In a modified form of the machine rotor A and hollow mould B are conically constructed, and the hollow mould oscillates parallel to the axis of the rotor.

In a further modification the hollow mould is a hollow cylinder excentrically arranged with regard to the rotor and of greater inner diameter than the outer diameter of the rotor. The hollow cylinder may rotate as well as the rotor, i. e., one of them oscillates or both oscillate. Both the cylinder or the rotor or one of them is suitably provided with profiles.

It is possible to impart various kinds of movement to the two rotatable parts described above. The oscillations are preferably circular or similar, i. e. all parts of the oscillating system move on a closed curve in a plane perpendicular to the axes of the two rotatable parts. It is, however, also possible to make at least one of the two rotatable parts oscillate in the path corresponding to straight lines substantially perpendicular to that part of its surface which is nearest to the surface of the other rotatable member. If both rotatable parts oscillate in straight lines, it is preferable to have them oscillate in opposite directions. Herein it is supposed—and this will be so in most cases—that the axes of the rotor and the cylinder are parallel to each other; in special cases, however, it is also possible that the axes are not parallel. The oscillations may then either be in one plane or likewise in different planes. Such oscillations may, for instance, be applied when, in view of the kind of driving, one or both rotatable parts are not cylindrical but of conical or like shape.

If both the rotor and cylinder perform circular oscillations, these oscillations may follow the same direction, whereby the conveying action on the material between the two is improved. But it is also possible to have both perform circular oscillations in opposite direction; thereby the kneading effect on the material is improved. Furthermore it is possible, when both the rotor and cylinder oscillate, that the frequency and the amplitude are in both cases the same or that the frequency and amplitude or each are different.

The profile may be the same in both parts; this is suitable, for instance, when the material between them is to be briquetted. In this case care must be taken that the profiles of both always act at the same part on the material from both sides. In the treatment of plastic masses such as rubber and the like, it may be preferable to have a different profile on the outer surface of the rotor than on the inner surface of the cylinder.

The revolving motion of the rotating parts may either be such that they rotate in the same direction, the peripheral velocity of the rotor being about the same as that of the inner circumference of the outer cylinder. This kind of motion is particularly preferable when a pulverulent or finely granular material is to be moulded in a definite form, for instance during the briquetting. But it is also possible, of course, to revolve the rotor and the cylinder in the same direction but with different velocity; grains of different size are thereby obtained. Finally the two rotating parts may revolve in opposite directions, which is suitable if pulverulent material is to be ground or mixed and granulated simultaneously, or if plastic masses are to be kneaded.

There exist the various possibilities of varying the profiles, the oscillations of the rotor and cylinder, and the rotation whereby it is possible to use the machine for the most various purposes. This variability in the application is an essential advantage of the new machine. A further advantage resides in the fact that by the application of rapidly successive oscillations excessive pressures are no longer necessary for the rolling so that the entire device may have relatively simple dimensions. Simplicity of cleansing the inner and outer surface of the rotor and cylinder respectively and the possibility of intermixing any additions (pulverulent or liquid) or of removing the treated material in an especially simple manner are further advantages of this type of machine.

Figure 7:
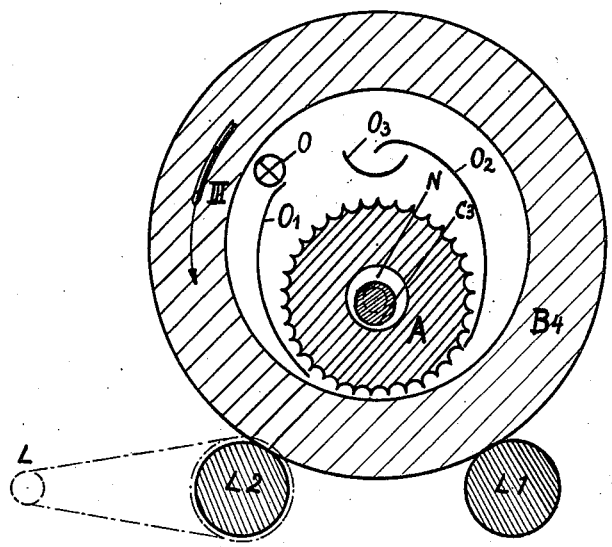
Figure 8:
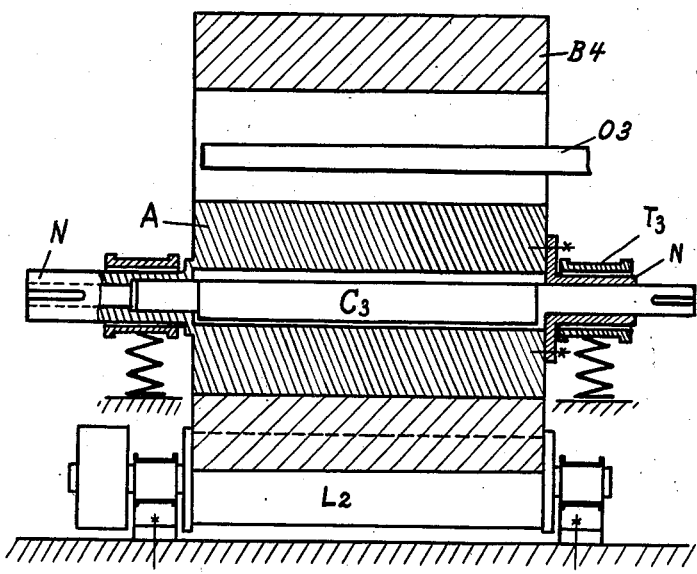

Figs. 7 and 8 of the accompanying drawings are vertical sections in planes at right angles to each other through another modification of applicants' apparatus.

The outer roll $B_4$ rotates slowly in the direction of arrow III. The roll rests on rollers $L_1$ and $L_2$; roller $L_2$ is driven by a motor L. Rotor A is excentrically mounted within the interior of cylinder $B_4$. The inner surface of cylinder $B_4$ is smooth; the periphery of the relatively small rotor A is profiled. Rotor A rotates in the same direction as cylinder $B_4$ and also performs circular oscillations. Axle N of rotor A is hollow and an unbalanced mass $C_3$ rotates therein, bearings $T_3$ of rotor A are elastically mounted.

A conveyer O, for instance a worm, extends into cylinder $B_4$ and introduces pulverulent material from above at the inlet side into the crevice between rotor A and cylinder $B_4$. This supply may be improved by the aid of a guide plate $O_1$. On its way through the crevice between the smooth cylinder $B_4$ and profiled rotor A the material is briquetted by the action of the rapid oscillations and at the outlet side it passes upwards between guide plate $O_2$ and cylinder $B_4$ until it falls, at the end of guide plate $O_2$ into discharge device $O_3$, for instance a conveyer band or a shaking channel, by which it is removed.

Figure 9:
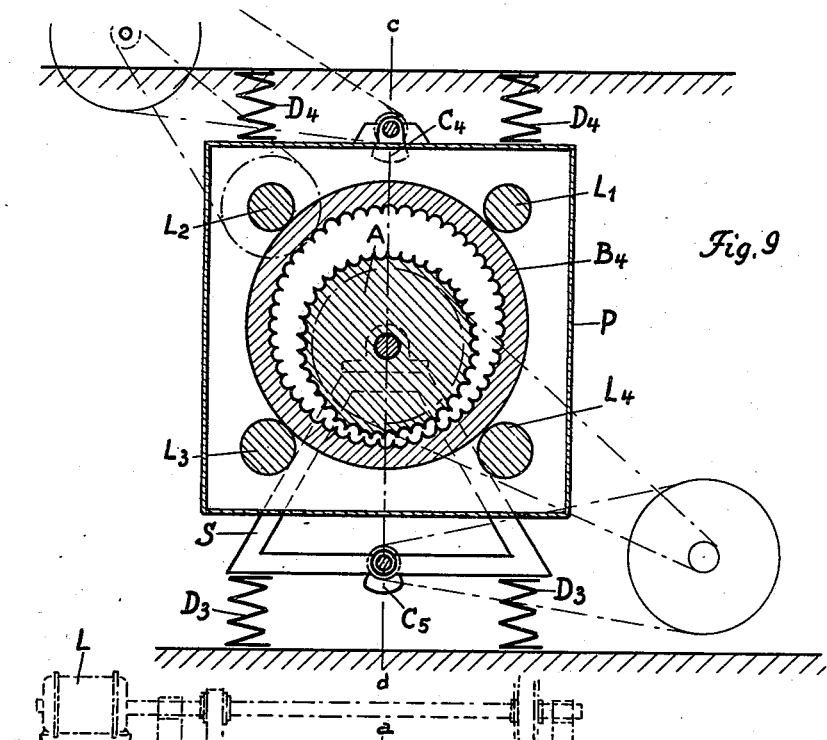
Figure 10:
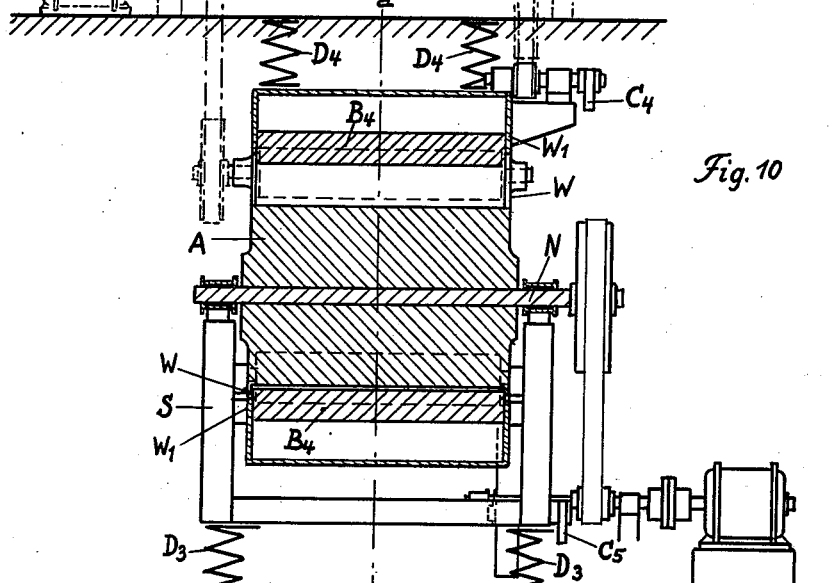

Figs. 9 and 10 illustrate another modification of the oscillating apparatus according to the invention:

Fig. 9 is a cross section on the line $a$—$b$ of Fig. 10.

Fig. 10 is a cross section on the line $c$—$d$ of Fig. 9.

In this device the rotor and cylinder both oscillate. Cylinder $B_4$ rests on rollers $L_1$, $L_4$, $L_3$ and $L_2$. Roller $L_2$ is driven by a motor $L$. All four rollers are elastically mounted in a housing frame $P$. The frame $P$ is elastically suspended by springs $D_4$ and is caused to perform circular oscillations by means of an unbalanced mass $C_4$.

Within cylinder $B_4$, which in this case is profiled, a likewise profiled rotor $A$ rotates. The axle $N$ of rotor $A$ is carried by a frame $S$ which rests on springs $D_3$ and is likewise caused by the unbalanced mass $C_5$ to perform circular oscillations. In order to prevent a lateral displacement of cylinder $B_4$ and rotor $A$ relative to one another or relative to casing $P$ rotor $A$ and casing $P$ are provided with collars $W$ and $W_1$.

Instead of producing the oscillations by rotation of an unbalanced mass, they may be produced by a positively coupled exciter, a resonance exciter or an electromagnetic exciter. It is furthermore possible to use these exciters in various combinations, for instance by exciting the rotor by means of a freely oscillating unbalanced mass and the cylinder by the Schieferstein method, i. e., by an oscillating member which transmits its impulses to the cylinder through an elastic coupling. Instead of a single exciter for each roll there may also be arranged several exciters side by side.

We claim:

1. A machine for simultaneously squeezing and beating plastic masses and fibrous materials comprising a rotatable rotor mounted within a corresponding hollow member in such a manner that there is a space between the rotor and the hollow member, at least one of these two parts being resiliently mounted to enable the same to vibrate in a plane substantially perpendicular to the axis of the rotor, means for rotating said rotor and means for imparting intermittent rapid impulse to at least one of said resiliently mounted parts to vibrate same.

2. A machine for simultaneously squeezing and beating plastic masses and fibrous materials comprising a rotatable rotor mounted within a corresponding hollow member in such a manner that there is a space between the rotor and the hollow member, at least one of these parts being profiled and resiliently mounted to enable the same to vibrate in a plane substantially perpendicular to the axis of the rotor, means for rotating said rotor and means for imparting intermittent rapid impulses to at least one of said resiliently mounted parts to vibrate same.

3. A machine for simultaneously squeezing and beating plastic masses and fibrous materials comprising a rotatable rotor mounted within a corresponding hollow member in such a manner that there is a space between the rotor and the member, at least one of these two parts being resiliently mounted to enable the same to vibrate in a plane substantially perpendicular to the axis of the rotor, the rotor and the hollow member being profiled and the profiles of the hollow member being in staggered relationship to those of the rotor, means for rotating said rotor and means for imparting intermittent rapid impulses to at least one of said resiliently mounted parts to vibrate same.

4. A machine for simultaneously squeezing and beating plastic masses and fibrous materials comprising a rotatable rotor mounted within a corresponding hollow member in such a manner that there is a space between the rotor and the hollow member, at least one of these two parts being resiliently mounted to enable the same to vibrate, means for rotating said rotor and means for imparting intermittent rapid impulses to at least one of said resiliently mounted parts to vibrate same, the hollow member being subdivided in such a manner that the forces actuated by its various parts are substantially counter-balanced.

5. A machine for simultaneously squeezing and beating plastic masses and fibrous materials comprising a rotatable rotor mounted within a corresponding hollow member in such a manner that there is a space between the rotor and the hollow member, at least one of these two parts being profiled and resiliently mounted to enable the same to vibrate, means for rotating said rotor and means for imparting intermittent rapid impulses to at least one of the resiliently mounted parts to vibrate same, the hollow member being subdivided in such a manner that the forces actuated by its various parts are substantially counter-balanced.

6. A machine for simultaneously squeezing and beating plastic masses and fibrous materials comprising a rotatable rotor mounted within a hollow rotatable cylinder, said cylinder acting as a hollow squeezing and beating surface for the rotor, in such a manner that there is a space between the periphery of the rotor and the inner surface of the cylinder, the outer diameter of the rotor being smaller than the inner diameter of the hollow cylinder, at least one of said parts being profiled, at least one of said parts being resiliently mounted to enable the same to vibrate in a plane substantially perpendicular to its axis, means for rotating at least one of said parts and means for imparting intermittent rapid impulses to at least one of said resiliently mounted parts to vibrate same.

7. A machine for simultaneously squeezing and beating plastic masses and fibrous materials comprising a rotatable rotor mounted within a hollow rotatable cylinder, said cylinder acting as a hollow squeezing and beating surface for the inner rotor, in such a manner that there is a space between the periphery of the rotor and the inner surface of the cylinder, the outer diameter of the rotor being smaller than the inner diameter of the hollow cylinder, at least one of said parts being profiled, at least one of said parts being resiliently mounted to enable the same to vibrate in a direction substantially rectangular to that part of its surface which is nearest the surface of the other part, means for rotating at least one of said parts and means for imparting intermittent rapid impulses to at least one of said resiliently mounted parts to vibrate same.

SIEGFRIED KIESSKALT.
WILHELM SCHAICH.